Patented June 15, 1943

UNITED STATES PATENT OFFICE 2,322,106

MANUFACTURE OF COATING COMPOSITIONS

László Auer, Bloomfield, N. J., assignor to Ridbo Laboratories, Inc., Paterson, N. J., a corporation of New Jersey No Drawing. Application September 9, 1940, Serial No. 356,103. In Hungary May 19, 1926

15 Claims. (Cl. 106—222)

This invention relates to the manufacture of coating compositions and it comprises two step methods of modifying organic isocolloid materials, such as fatty oils, resins, etc., with the aid of polar compounds, wherein a minor amount of a polar compound is dispersed or dissolved in the organic isocolloid material to produce a modified isocolloid product containing sufficient polar compound to markedly modify the properties thereof, and then the modified isocolloid product so obtained is itself used as a modifying agent and is mixed and blended with a larger amount of an organic isocolloid material, either the same or a different organic isocolloid, and it also comprises the modified organic isocolloid products so obtained and the coating compositions containing the same, all as more fully hereinafter described and as claimed.

This application is a continuation in part of my prior application Serial No. 446,172 filed April 21, 1930, now Patent No. 2,213,943. That application is, in turn, a continuation in part of my application Serial No. 143,786 filed Oct. 23, 1926 (now Patent No. 2,189,772) and of the various continuations thereof, previously filed by me, particularly Serial No. 359,425 filed April 30, 1929, now Patent 2,213,944 and Serial No. 446,170 filed April 21, 1930; said Serial No. 143,786 being the parent application of all such prior applications.

The said parent application and the several continuations thereof, together with the patents which have issued upon the same, are set forth in the following Table A.

Table A

| Serial No. | Filed | Patent No. | Issued |
|---|---|---|---|
| 143,786 | Oct. 23, 1926 | 2,189,772 | Feb. 13, 1940 |
| 273,159 | Apr. 26, 1928 | 1,985,230 | Dec. 25, 1934 |
| 273,160 | do | 1,985,231 | Do. |
| 359,424 | Apr. 30, 1929 | 2,007,958 | July 16, 1935 |
| 359,425 | do | 2,213,944 | Sept. 10, 1940 |
| 359,426 | do | 1,980,366 | Nov. 13, 1934 |
| 359,427 | do | 1,957,437 | May 8, 1934 |
| 446,170 | Apr. 21, 1930 | 2,234,949 | Mar. 18, 1941 |
| 446,171 | do | 1,980,387 | Nov. 13, 1934 |
| 446,172 | do | 2,213,943 | Sept. 10, 1940 |
| 446,174 | do | 2,180,342 | Nov. 21, 1939 |
| 466,587 | July 8, 1930 | 2,106,708 | Feb. 1, 1938 |
| 188,014 | Jan. 31, 1938 | 2,244,666 | June 10, 1941 |
| 235,800 | Oct. 24, 1938 | 2,234,545 | Mar. 11, 1941 |
| 305,479 | Nov. 20, 1939 | 2,293,038 | Aug. 18, 1942 |
| 318,659 | Feb. 12, 1940 | 2,298,270 | Oct. 13, 1942 |

In my prior applications, listed ante, I have described various methods of modifying organic isocolloid materials using many different modifying agents or polar compounds. And my generic invention relates to processes for the modification of the physical properties of organic isocolloids, particularly those containing unsaturated carbon compounds, and to the modified isocolloid products obtained.

By "isocolloid" or "isocolloid materials," I mean organic isocolloid substances wherein the dispersed phase and the dispersion medium of the colloidal system thereof are both of the same chemical composition, but in a different state.

And as disclosed in my prior applications, I have found that by dispersing or dissolving various modifying agents in an organic isocolloid substance, I can obtain modified products having altered physical properties, etc., which are useful in the commercial and industrial arts. The modifying agents employed are organic or inorganic compounds which are electrolytes or polar compounds containing ions, radicals or residues capable of influencing the said modification of the isocolloid substance.

And as stated in my prior application Ser. No. 446,172 (Patent No. 2,213,943), I have further discovered that my modified isocolloid products, containing a polar compound dispersed therein, are themselves useful as modifying agents for modifying the properties of the same or other isocolloid materials.

And as disclosed in my prior Ser. No. 446,172, the modified organic isocolloid products, of my earlier and co-pending applications, may be dissolved or dispersed in natural or artificial isocolloid materials, particularly those materials which contain only a relatively small amount of dispersed phase, to produce other useful modified products. The modified isocolloid products used, as the modifying agent, assist in supplying the dispersed phase in the product. And in the methods there disclosed, the new modifying agent (the modified isocolloid product from prior processing) is used in much the same manner as the modifying agent (polar compound) in said earlier and copending applications listed ante.

That is, the processes described in my prior application Serial No. 446,172 are more or less two-step methods wherein the original modifying agent or polar compound is dispersed in the selected isocolloid material and then the modified product so obtained (solution or dispersion of the polar compound in the isocolloid material) is, in turn, dispersed in or blended with more of the same or a different isocolloid substance to convert the latter substance into the desired modified product.

And in my Serial No. 446,172, I have claimed the manufacture of improved, compounded mineral oils, useful as lubricants, from mineral oils, particularly refined mineral oils, by such methods. And in the methods there claimed, the mineral oil is modified by dispersing therein, a minor amount of a modified fatty oil product containing a polar compound dissolved therein, specifically modified, heat-bodied fatty oils containing an organic polar compound, such as an aromatic sulphonic acid and other organic polar compounds containing an acidic inorganic residue attached to the organic residue. Also in that application, I have claimed two step methods of making improved mineral oils which comprise first heat-bodying the fatty oil in the presence of 2 to 30 per cent of a dry polar compound capable of facilitating the heat-bodying and then dispersing a minor amount of said heat-bodied fatty oil containing the polar compound dissolved therein, in a mineral oil, to produce said compound lubricants.

The present application is directed to the manufacture of modified organic isocolloids, useful as and in coating compositions, from organic isocolloids such as fatty oils, resins, etc., by similar methods. And in the present invention, the fatty oils or resins are modified by dispersing or dissolving therein, a minor amount of a modified organic isocolloid product containing a polar compound dissolved therein in minor amounts. And generally, I employ from 2 to 30 parts of the modified organic isocolloid product to 100 parts of the organic isocolloid to be so modified, such as fatty oils, resins, etc., in practicing such methods.

By using a modified organic isocolloid product containing a polar compound dissolved therein, as the modifying agent, in modifying an organic isocolloid material, certain advantages are obtained. By the present invention, it is possible to produce the final modified product with a lighter color than can be obtained by the direct use of the original modifying agent, namely an electrolyte or polar compound, such as those set forth in prior applications Ser. Nos. 143,786 and 359,425. And in the present methods, frequently lower temperatures may be employed to disperse the new type of modifying agent in the organic isocolloid material to be modified. In some cases, temperatures from 100° to 200° C. may be used; the organic isocolloid material and the new modifying agent being merely fused or melted together. If, however, it is desired that the fatty oil or a mixture containing it be heat-bodied, as well as modified with the added modifying agent, then temperatures of 200° C. or more may be used; the temperature and time of heating being that required to give the desired polymerization of the oil or oil mixture. Polymerizable resins may also be heated to polymerizing temperatures in my processes, if desired. On the other hand, sometimes the incorporation of the new modifying agent in the organic isocolloids, such as fatty oils and other liquid materials, may be carried out at temperatures below 100° C. and even at room temperature, particularly when solvents are used to facilitate the mixing or blending. However, it is usually advantageous to heat the mixture of modifying agent and organic isocolloid. And generally, I employ temperatures from 100° to 300° C.

Further, the present methods are advantageous for modifying natural fatty oils and other organic isocolloid materials having a low or comparatively small concentration of dispersed phase. The modified organic isocolloid products, here used as the modifying agent, assist in increasing the concentration of dispersed phase and supply part of the dispersed phase in the new products so obtained. Thus by the present methods, modified, bodied fatty oil products can be readily obtained with shorter heating or at lower temperatures or both.

For instance, it is possible to dissolve 25–30 parts of sodium sulphide in 100 parts of linseed oil at temperatures of 250 to 300° C. and obtain a very hard, bees-wax-like product. Then by dispersing this greatly modified product in a further 400 parts of linseed oil at moderate temperatures (by simply melting together both ingredients), a product may be obtained which is similar to a linseed oil solidified with the aid of 5 per cent of sodium sulphide but which is much lighter in color. Besides the lighter color, it can be seen that the amount of heat necessary is greatly reduced by the improved process. It should be mentioned that the greatly modified linseed oil product acts partly as a dispersed phase in the linseed oil and enables it to undergo colloidal changes. Likewise, if 100 parts of linseed oil are modified with 30 parts of benzidine base, a product is obtained which, when heated with 500 parts of linseed oil, gives a product with a lighter color than that obtainable by modifying linseed oil directly with 5 per cent benzidine base, alone. Such products are useful in making coating compositions. Other illustrations of my two step methods of making modified organic isocolloids, useful as and in coating compositions, both plastic and liquid coating compositions, are given post.

That is, the present invention also comprises two-step methods wherein the organic isocolloids employed in both the first and second steps thereof are isocolloid materials of the class consisting of fatty oils, resins and like liquid and solid organic isocolloids useful in making coating compositions.

Illustrative of the organic isocolloids of that class, useful in the present methods, in either or both of the steps thereof, I may mention the following:

Fatty oils of vegetable and animal origin, including drying, semi-drying and non-drying fatty oils.

Fatty acids of drying, semi-drying and non-drying fatty oils, advantageously those of drying oils.

Esters of such fatty acids, including esters thereof with polyhydric alcohols, such as glycerol, glycols, etc., or with monohydric alcohols of high molecular weight; artificial oils, waxes and resins, particularly those containing esters of the acids of drying fatty oils.

Waxes, including vegetable, mineral and animal waxes, such as carnauba, palm or myrtle wax, ozokerite or montan wax, beeswax, wool-wax, sperm oil (liquid wax), spermaceti wax, etc., and other solid and liquid wax-like organic isocolloid materials containing high molecular weight fatty acids or esters thereof with monohydric or dihydric alcohols.

Natural resins, such as gum and wood rosins, copals and other varnish resins of natural origin.

Synthetic resins, particularly those made from or containing rosin and other natural varnish resins, as a component thereof, and those made from or containing the acids of fatty oils and of natural resins and their derivatives such as esters of said acids with glycerine or other polyhydric alcohols, namely ester gum (glycerol rosinates), rosin-modified or drying alkyd resins and like complex synthetic esters of such acids, particularly those containing esters of the acids of drying fatty oils.

The above organic isocolloid materials may be used with advantage in the present invention to obtain various modified products useful as and in coating compositions. Excellent varnish bases can be readily obtained from the drying fatty oils and resins. For instance, by my two step methods, I can prepare blended mixtures of modified oil and modified resin, by using a fatty oil in one step and a resin in the other step. Likewise, blended mixtures of two different types of modified resins or of modified fatty oils can be readily obtained in like manner, using one resin or oil in the first step and another and different oil or resin in the second step. Also I may use other organic isocolloid materials in the present invention to obtain modified organic isocolloid products useful as and in coating compositions. Of these organic isocolloid materials, the following are typical:

Mineral oil fractions, of high molecular weight and of high boiling point, containing substantial amounts of naphthenic bodies and other unsaturated compounds, such as high boiling fractions of naphthenic oils obtained by distillation or cracking or both, and high boiling naphthenic mineral oil fractions obtained by solvent extraction of mineral oils.

Goudrons or petroleum distillation residues.

Asphalt and asphalt oils.

Tar and tar oils.

Pitches.

Rubber and rubber-like hydrocarbons (synthetic rubbers).

Chemically pure organic isocolloid bodies or materials, such as styrene.

The above organic isocolloid materials are complex hydrocarbon mixtures containing unsaturated carbon compounds, namely compounds containing one or more double bonds or points of unsaturation. And they may be used with advantage in the present invention. By using such organic isocolloid materials in the present methods, I obtain modified isocolloid products useful as and in coating compositions, particularly plastic compositions. They are advantageous for such purposes.

From the list of suitable organic isocolloid materials given ante, clearly many different modified isocolloid products can be obtained from various combinations of them with my modifying agents according to the present invention, and a wide variety of products useful in the manufacture of varnishes, linoleum, rubber composition, etc. obtained within the broad scope of this invention. Plastic and liquid coating compositions are easily produced for a variety of industrial applications, by my new two step method.

Obviously there are many major embodiments within the broad scope of this invention, depending upon the isocolloid substance used in the first and second steps and the initial modifying agent employed. Two major species arise, depending upon whether the same or a different isocolloid material is used in the second step; but as the isocolloid substance which is being modified in the second step, usually forms the major portion (in preponderating amount) of the final modified product, it determines the general character of the product obtained in the present processes.

In the present invention, the methods and procedures for incorporating the polar compound or initial modifying agent used in the first step of my two-step processes here, may be substantially the same as those employed in my prior processes as disclosed in my Serial No. 143,786 and the various continuation thereof, particularly Serial Nos. 359,425 and 446,170. That is, the general procedure in the present two-step methods is substantially the same as that disclosed in my prior application Serial No. 446,172, as to mixing, heating, etc. in the two-step methods there shown.

Also, in the first step of the present processes, the same classes of polar compounds and electrolytes disclosed in my said prior applications, may be used here; including the particular polar compounds specifically set forth in such applications.

In fact, the modified organic isocolloids obtained by the processes set forth in said prior applications may be used as the modifying agent in the second step of the present processes, as stated ante. And the modified fatty oils and modified resins specifically disclosed in such applications are advantageous as the new modifying agent in the second step of the present method.

Likewise, in the present invention, I employ a minor amount of such polar compounds or modifying agents in the first step. In general, the amount of polar compounds employed is that which will give the desired percentage of polar compound in the final product. In most cases, to secure the modification desired in the first step of the present processes, from one to thirty parts of polar compound to one hundred parts of the organic isocolloids employed therein, is sufficient. And as pointed out ante, twenty-five to thirty percent of the polar compound may be advantageously used in making greatly modified isocolloid products; these being particularly useful in modifying other organic isocolloid in which the concentration of dispersed phase is relatively low.

In both steps of my present processes, various methods may be used to disperse the modifying agent in the isocolloidal to be modified, so long as thorough (molecular or colloidal) solution is secured.

The modifying agents (both the initial agent and the modified isocolloid product) should be added to the starting material (isocolloid substance to be modified) in a dry form (without the presence of water) and in relatively small quantities. Generally the range of proportions is from 2 to 30 parts of modifying agent to 100 parts of isocolloid substance. Usually 2 to 10 per cent of modifying agent is used, in either of the two-steps of the present methods. However, a feature of one species of the present invention is to use as much as 25 to 30 per cent of the initial modifying agent in the first step to produce a greatly modified isocolloid product which, itself, is highly advantageous as a modifying agent in the second step; this feature being more fully illustrated, post.

Thus by my present two-step methods, I obtain modified isocolloid products containing from 0.01 to 10 per cent of a polar compound dissolved therein as the modifying agent. Those containing 1 per cent or more of the polar compound show a marked modification of the physical properties of the organic isocolloid so modified. And those containing 2 to 10 per cent of a polar compound are particularly advantageous in making coating compositions. And to produce such modified organic isocolloid compositions containing the said amounts of polar compound, I incorporate in the second step of my processes an amount of modifying agent sufficient to introduce the desired proportion of polar compound and to give the modification wanted. And as the modifying agents there used are modified isocolloid products containing from 2 to 30 per cent of polar compound dispersed therein, the amount added is adjusted accordingly. And when such modifying agents contain relatively small amounts of polar compound, naturally larger amounts are required to introduce the desired proportion of polar compound. And if the final product is to contain relatively high amounts of polar compound, the new modifying agents must be added in relatively large amounts; sometimes in amounts greater than 30 per cent. But in all cases, the organic isocolloid in the second step is present in greater amount than the modifying agent added. That is, my new modifying agents are used in minor proportion.

In order to insure complete dissolution or dispersion of my modifying agents, in each step of my processes, the operations are advantageously carried out under the application of heat. The degree of heat required depends upon the nature of the isocolloid material being modified and the modifying agent used; by using a modifying agent which is directly soluble in the isocolloid to be modified, mere mixing is sufficient. However, the range of temperatures employed is generally from 100° to 300° C. Only occasionally is a higher temperature necessary for satisfactory results. The heat treatment promotes the complete (molecular or colloidal) dissolution of the modifying agent in the substance to be treated. In some cases it may be advisable to continue the heat treatment after the dissolution or dispersion of the modifying agent is substantially complete. Thus, for instance, when the isocolloidal material being modified, is a fatty oil and the agent is dispersed in it at 200° C. or above, continued heating produces a far-going heat-bodying of the oil and in this way it is possible to produce relatively hard, solid products when desired.

I have further found that the properties of the products obtained can be influenced by the nature and physical condition of the gas present in contact with the material undergoing treatment. That is by varying the pressure, the specific nature of the products can be somewhat changed. These processes can be effected under reduced, atmospheric or increased pressure. Generally speaking, the rarification of the gas present intensifies the actions in these processes. Thus, in many cases, the heating is effected under vacuum. Likewise, the presence of air or other gases somewhat alters the results obtained. When a gas treatment is employed in conjunction with the heating, the gas is usually blown or passed through the hot mixture. For such purposes, non-oxidizing gases such as sulfur dioxide, hydrogen sulfide, $CO_2$ and the like, are advantageous. Also the gases may be developed in situ from compounds such as sulfites, sulfides, carbonates and the like, to give the corresponding gases according to the conditions employed. Likewise, peroxides may be used to develop oxygen in situ and in this way oxidized products can be obtained.

Likewise, the polar compound may be produced in situ within the isocolloid by using added compounds which react during the heating to form the desired modifying agent.

In modifying the initial isocolloid, true or colloidal solutions of one or more electrolytes in an organic solvent may be used.

Having generally set forth the procedural steps of the present methods, I will now illustrate the respective materials which may be employed therein. As stated ante, many and various natural and artificial organic isocolloids may be used, particularly those of high molecular weight containing unsaturated compounds, such as the fatty oils, natural resins, etc., set forth in Ser. Nos. 143,786 and 359,425.

As the initial modifying agent, I may use a variety of polar compounds or electrolytes. And as stated in Ser. No. 359,425 and my other prior applications, the following classes thereof are typical:

Metal salts of organic or inorganic acids.
  Mixtures of such salts and acids.
  Mixtures of such salts and metal peroxides.
Organic acids, both aromatic and aliphatic acids, and the acyl halides thereof.
Organic bases, such as amines and hydroxy compounds.
Organic compounds containing an inorganic acidic residue and an organic residue.
  Organic halogen compounds
    Aromatic
    Aliphatic
  Organic sulphonic acids and their esters
  Organic sulphonyl chlorides
  Organic esters of inorganic acids
  Inorganic salts of organic bases
  Nitro compounds
Metallo-organic compounds
  Metal alcoholates
  Aryl-metal compounds Various specific examples of such initial modifying agents are given post, with suitable cross reference to my related prior applications.

In Ser. No. 143,786 (now Patent No. 2,189,772), I disclosed various methods for modification of oils, resins and other organic isocolloids, by means of "electrolytes" or polar compounds. In those methods, as the electrolyte, I may use salts, acids and organic metal compounds, either separately or mixed, to modify the organic isocolloid. And as disclosed in that application, advantageous modifying agents are the polar compounds or electrolytes containing certain ions (cations or anions or both), namely, the following:

| Anions | | Cations |
|---|---|---|
| Carbonic | Thiosulphuric | Ammonium |
| Tartaric | Nitric | Sodium |
| Oxalic | Nitrous | Potassium |
| Acetic | Citric | Iron |
| Formic | Hydrocyanic | Aluminum |
| Hydrochloric | Salicylic | Calcium |
| Hydrobromic | Naphthalene- | Cobalt |
| Hydriotic | sulphonic | Lead |
| Sulphuric | Sulphanilic | Antimony |
| Sulphurous | Naphthenic | |
| Hydrosulphuric | Thiocyanic | |

And various compounds containing one or more of such ions, either the cations ions or the anions ante, are used as the modifying agent in the processes of Ser. No. 143,786. As there stated the anions as well as the cations are effective in my processes and sometimes the acids, alone, are used. However, as a general rule the cations have a greater effect. Those polar compounds containing an anion and a cation are advantageous. And usually metal salts are employed. They may be used alone or mixed with acids. And acid salts, such as salts of hydrosulphuric acid, are useful. And as further disclosed in Serial No. 143,786, minor amounts of such modifying agents are incorporated in the oil or other organic isocolloid to be modified.

And as there described, the modification is effected by dispersing or dissolving the said modified agent in the isocolloid material. This operation can be effected at temperatures ranging from room temperature to the boiling point of the isocolloid material and under reduced, atmospheric or increased pressure. That is, the isocolloid material and a suitable amount of modifying agent (metal salt etc.) are mixed together and heated, if necessary, until the agent is dispersed or dissolved in the isocolloid material and that material is modified to the desired condition. Of course, the ratios of materials, the temperature and time of heating and the pressure are varied according to the materials used and the final product desired.

In most of the methods there described, the organic isocolloid, (starting material) such as a fatty oil, is heated with a minor amount of the electrolyte or polar compound, at reduced, ordinary or increased pressure; with or without simultaneous or subsequent treatment with gases or treatment with sulphur or sulphur compounds, such as sulphur chloride. Again, the organic isocolloid and the electrolyte may be mixed cold, that is, the modifying agent incorporated at room temperature in the organic isocolloid to be modified. This is advantageous when the modifying agent or polar compound is directly soluble at room temperature in the isocolloid being modified thereby. Also the mixing and/or heating may be done in the presence of purely organic bodies, such as phenols, naphthols, naphthalene, chloroform, acetone, alcohols, formic acid, acetic acid, their homologues or derivatives etc. which modify certain physical properties, such as adhesion, elasticity, etc. of the mix obtained; some of these organic bodies being organic solvents. As stated therein, the mixtures are usually heated to temperatures considerably above room temperature and below the boiling point of the organic isocolloid being modified. For instance, the electrolyte and the organic isocolloid may be melted together, that is, fused together. Likewise, the specific illustrative examples given in Ser. No. 143,786 are advantageous for fatty oils, such as linseed oil, rapeseed oil, etc.; even solid oil products as well as viscous oil products being obtained as desired.

In the specific illustrations there given, about 5 per cent of a metal salt is mixed with a fatty oil and the mixture heated to 300°-350° C. until a modified heat-bodied oil product is obtained which, upon cooling, or more or less solidified; the heating usually being under vacuum.

That application (Ser. No. 143,786) is specifically directed to heat-bodying a fatty oil in the presence of a metal salt, which facilitates or accelerates the bodying of the oil; the invention claimed being an improvement in heat-bodying fatty oils in the presence of such salts, particularly sodium oxalate.

The modified isocolloid products obtained by the process of Ser. No. 143,786 are useful and are employed in the present invention as modifying agents. That is, the processes of that application form the first step of some of the present two-step methods, the modified isocolloid products thereof being here dispersed in more of the same or a different isocolloid material to modify the latter, as stated ante.

In Ser. No. 359,427, I have described processes wherein alkali metals and their oxides and hydroxides are employed as modifying agents. The amount of such alkaline modifying agents there employed may vary from that theoretically necessary to completely saponify the fatty oil down to about 3 per cent on the oil, thus a wide variety of modified products can be obtained. With the smaller amounts of said alkaline modifying agents, modified oil products are obtained which comprise a modified fatty oil having an alkali metal soap dispersed therein as a polar compound or modifying agent; that compound or agent being, so to speak, formed in situ.

And as further disclosed in Ser. No. 359,427, when the modified oil products thereof are subsequently sulphurized as disclosed therein, the sulphurized product comprises a mixture of metal soap and sulphurized fatty oil. In such two-step methods of modifying the fatty oil, usually 2 to 5 per cent of an alkali compound on the oil is employed in the first step.

While temperatures between 100° and 300° C. may be used to disperse the alkali metal modifying agent in the oil and effect the desired modification, it is advantageous to use temperatures in the upper range, 200-300° C. With temperatures in that range, a heat-bodying or polymerization of the fatty oil or partially split glyceride occurs. Thus some of the modified products so made are mixtures of metal soap and heat-bodied or polymerized oil, the soap being dispersed in the oil. Those modified isocolloid products can also be sulphurized as shown in Examples 4 and 5 of Patent No. 1,957,437.

Also, in the methods of Ser. No. 359,427, other agents may be added to the mixture in conjunction with the alkali metal compound, for instance, added prior to the heating. Metal peroxides, particularly alkaline earth peroxides, such as barium peroxide, may be so used. Likewise, metal-free organic materials can be so employed, for instance, any of the following compounds:

| Phenols | Ketones |
| Arylamines | Alcohols |
| Hydrocarbons | |

Among these compounds, specifically mentioned, are alphanaphthol, pyrogallol, benzidine, quinoline, benzene, glycerol, etc., as being useful as additions to the mixture. When added they facilitate dissolution of the alkali metal compound in the oil. Also the final properties of the modified product are influenced when they are used.

Ser. No. 359,427 is specifically directed to methods wherein the fatty oil is mixed with a solid, substantially water-free alkaline modifying agent of the said class and the mixture heated to between 200° and 300° C. until a solidified product is obtained on cooling and wherein the modified product so obtained is sometimes vulcanized with sulphur.

Here again, the modified oil products so obtained, either before or after sulphurizing may be used in the present process, as the modifying agent in the subsequent modification of fatty oils, mineral oils, etc.

In Ser. No. 359,426, I have also described methods wherein metal peroxides are used in modifying isocolloid materials, such as, fatty oils, etc. There the metal peroxide, particularly peroxides of alkali metals of alkaline earth, of magnesium and of zinc, are used as the main modifying agent; usually from 2 to 10 per cent of metal peroxide on the oil being employed.

The following peroxides are typical of those that may be used:

The peroxides of

| Magnesium | Calcium |
| Zinc | Sodium |
| Barium | Nickel |
| Strontium | Bismuth, etc. |

The alkaline earth metal peroxides are advantageous. A variety of modified oil products can be obtained depending upon the oil used (linseed oil, castor oil, etc.) and the other conditions employed. The mixture of oil and metal peroxide is heated to temperatures sufficient to disperse or dissolve the metal compound in the oil so as to secure the desired modification; temperatures between 200° and 300° C. being satisfactory in most cases. Those between 250° and 300° C. are advantageous. Such temperatures are within the range at which fatty oils become heat-bodied or polymerized. When the heating is effected under vacuum, improved products are obtained.

As in Ser. No. 359,427, the modified products can be sulphurized or vulcanized. Also the stated metal-free organic compounds may be used in conjunction with the metal peroxides as with alkali metal oxides, as shown ante.

Ser. No. 359,426 is specifically directed to processes wherein the fatty oil is mixed with 2 to 10 per cent of the stated class of metal peroxides and the mixture heated to between 200° and 300° C. until solidified oil products are obtained, the heating usually under vacuum.

As before, the modified isocolloid products, either before or after sulphurization, obtained according to Ser. No. 359,426, can be used as modifying agents in the present invention, as stated ante.

In Ser. No. 446,170 I have described processes for modifying fatty oils and other isocolloid materials wherein amines are used as the modifying agents; particularly aromatic amines having a relatively high molecular weight such as monoamines of naphthalene, etc., and diamines of phenylene, diphenyl and similar compounds. That application being in part a division and in part a continuation of Ser. No. 359,425, the procedural steps are much the same as in the parent application.

A wide range of amine compound is shown in addition to the amine compounds shown in my other applications, particularly Ser. No. 359,425; some of these compounds containing primary, secondary or tertiary amine groups and several containing two or more amine groups. The following which are specifically mentioned, are typical of those that may be used:

Mono-aromatic amines: R—NH$_2$

Alpha naphthylamine
Beta naphthylamine
And the naphthylamines also containing sulphonic, hydroxy and other substituent groups.

Phenylene diamines: H$_2$N—R—NH$_2$

Para-phenylene diamine
Ortho-phenylene diamine
Meta-phenylene diamine
Para-tolylene diamine Diphenyl diamines: H$_2$N—R—R—NH$_2$ Benzidine
Dianisidine Diphenyl diamines of complex structure having the two phenyl connected with a "bridge" linkage:

H$_2$N—R—X—R—NH$_2$

| pp-Diamino-diphenyl methane | X=—CH$_2$— |
| pp-Diamino-diphenyl ether | X=—O— |
| pp-Diamino-diphenyl sulphide | X=—S— |
| pp-Diamino-diphenyl amine | X=—NH— |
| pp-Diamino-diphenyl urea | X=—HN—CO—NH— |
| pp-Diamino-diphenyl thiourea | X=—HN—CS—NH— |
| pp-Diamino-diphenyl benzophenone | X=—CO— |

It is to be noted that in some of these compounds, oxygen, sulphur and other substituent groups are present in the molecule in addition to the amine group or groups. Some contain secondary amine groups in addition to the primary amine group. In addition to these, other amines of even more complex structure may be used. The following are illustrative of such compounds.

Diamino dihydroxy anthraquinone disulphonic acid
Diamino tetrahydroxy anthraquinone disulphonic acid
1:4 diamino anthraquinone
p-diamino-dimethyl carbazole
Michler's ketone
Michler's hydrol
Safranine
Eurhodine
Diaminodiphenazine
Diaminofuchsonimine
Benzyl-ethyl-anilinesulphonic acid The aromatic compounds containing condensed benzene nuclei, such as the anthraquinone compounds, etc., are advantageous.

In all of these diamines the two amine groups are joined by an aromatic nucleus comprising one or more phenyl groups, the general formula being H$_2$N—Q—NH$_2$ wherein Q is an aromatic group.

One of the advantages of the amines as modifying agents is that they are relatively easier to dissolve or disperse in fatty oil and other isocolloids to modify them.

The amines may be used by themselves or in conjunction with other modifying agents, etc., in modifying isocolloid materials. For instance, the amines may be used in combination with compounds comprising within the molecule an acidic inorganic residue and an organic residue, such as an organic halogen compound, aromatic sulphonic acid, etc. Sometimes it is advantageous to use as the modifying agent an organic compound containing both an amine group and an acidic residue, such as an aminoaromatic sulphonic acid, amino carboxylic acid, etc.

Ser. No. 446,170 is specifically directed to methods wherein a fatty oil is mixed with a small amount, less than 30 per cent and usually 2 to 10 per cent, of an amine compound of high molecular weight, particularly diamines including those having the phenyl groups connected by said bridge structure, and the mixture heated to 200° C. or above, until a solidified modified product is obtained upon cooling and wherein the modified oil product is sometimes sulphurized.

The modified products so obtained, either the unsulphurized or sulphurized products, may be used in the present invention as a modifying agent to modify other or more isocolloid material.

In Ser. No. 359,425, of which the present application is a continuation in part and directly depends as to disclosure of certain organic isocolloid materials and polar compounds useful in the present two step methods, I have described many illustrations of my generic invention in modifying isocolloids and listed a large number of typical isocolloid materials and modifying agents that may be employed in these processes.

There I have given a typical list of fatty oils that may be used, it being as follows:

| Tung oil | Sunflower oil |
|---|---|
| Linseed oil | Rapeseed oil |
| Castor oil | Walnut oil |
| Fish oils (train oils) | Corn oil |
| Poppyseed oil | Olive oil |

In the above list the ease of transformation under equal conditions decreases in the order given; the first mentioned oils are most readily modified and give the hardest modified products, whilst the oils at the end of the series are more slowly modified and give less solid products, in most instances. As further examples of isocolloid materials which can be modified by my processes, I have mentioned the following in my Ser. No. 359,425; rubber, mineral oils containing naphthenic acids, natural resins particularly those of American, French, Spanish and Greek origin, asphalt, pitches, etc., in addition to the fatty oils disclosed. And as further stated in that application, modified products from fatty oils, suitable for the manufacture of lacquers and varnishes, are obtained by the processes of my earlier application Ser. No. 143,786 in particular from tung oil, linseed oil, castor oil, sunflower oil and the like.

Further, valuable lacquer bases can be obtained from natural resins by solidification, as pointed out in Serial No. 359,425. As there disclosed, hardened resins are obtained by heating rosin with a minor amount (5%) of zinc peroxide and of lithium sulphite until the reagents dissolve; a hardened or solidified resin product being obtained on cooling. Other metal peroxides and metal salts useful in such methods are given in that application; the use of metal peroxides in conjunction with metal salts being also advantageous in modifying fatty oils and other organic isocolloids, as well as in solidifying resins.

Also, as shown in Ser. No. 359,245, modified resin products useful in oil lacquers (varnishes) can be obtained from natural resins by liquefaction. As there stated, the liquefied resins have excellent drying properties and may be used as substitutes for drying oils in oil lacquers. And as there disclosed, the liquefaction is carried out by heating the resin with a minor amount of a metal salt in vacuo; advantageously at a temperature of 270°-280° C. under a vacuum of 25-30 inches of mercury. Various metal salts useful in such methods are given in my Serial No. 359,425.

And in that application, in addition to the modifying agents shown in my earlier Ser. No. 143,786 and other copending companion applications, I give a further number of illustrative polar compounds; some inorganic, some organic and others containing both organic and inorganic groups. A large number of the latter group are shown to illustrate the various sub-classes thereof which are advantageous in my methods.

Most of the modifying agents or polar compounds disclosed in Ser. No. 359,425 are organic polar compounds containing within the molecule, an acidic inorganic residue and an organic residue. By an acidic inorganic residue, I mean such an inorganic residue as can be converted, by the addition of one or more hydrogen atoms into an inorganic acid (including carbonic acid as inorganic).

As a class, such organic polar compounds are advantageous for the present purpose; they being somewhat easier to disperse in the isocolloid material, as stated in Ser. No. 359,425. They may be represented by the following generic formula $$A-X$$

wherein A represents the organic residue and X represents the acidic inorganic residue. Those containing a purality of such groups imparting polarity to the organic residue are particularly advantageous in the present invention.

Such modifying agents or polar compounds may be classified in various ways, according to the groups present in the molecule. The following is one broad classification of the compounds specifically mentioned:

Metal salts of inorganic acids
Metal salts of organic acids
Organic salts of organic acids
Organic salts of inorganic acids
Organic bases
Organic acids
Organic halogen compounds
Organic nitro compounds
Metallo-organic compounds Of the metal salts the following are specifically mentioned as illustrative of the generic and sub-generic classes:

Ammonium iodide
Magnesium sulfate
Magnesium chloride
Zinc carbonate
Zinc bromide
Sodium sulphide
Barium sulphide
Barium thiocyanate
Lead chromate
Potassium dichromate
Cadmium sulphide
Sodium bicarbonate
Lithium sulphite
Tin carbonate
Tin sulphite
Tin sulphide
Antimony sulphide
Zinc sulphide
Barium sulphide
Barium carbonate
Calcium sulphite
Strontium sulphite
Magnesium sulphite
Barium sulphite
Lead sulphite
Cadmium sulphite
Mercuric sulphate In addition to the above inorganic salts, I have also disclosed specific examples of salts of organic acids in my Ser. No. 359,425, as illustrative that class of salts; these are as follows:

Sodium 2:6:8 naphthylamine disulphonate
Sodium 2:6:8 naphthol disulphonate
Sodium 1:8:3:6 aminonapthol disulphonate
Sodium 1:5 naphthol sulphonate
Sodium 2:3:6 naphthol disulphonate
Sodium 2:6 naphthol sulphonate And as shown in that application, salts of organic acids are advantageous in modifying fatty oils and other isocolloids.

A number of organic halogen compounds, both aromatic and aliphatic, containing chlorine, iodine, etc., are given, of which the following are illustrative:

o-Dichlorobenzene
p-Dichlorobenzene
Trichlorobenzene
Naphthalene tetrachloride
Pinene hydrochloride
4-chloro-o-anisidine
p-Nitro-chloro-benzene
Triphenyl-chloro-methane
Benzoyl chloride
Benzyl chloride
Acetyl chloride
Chloral hydrate
Trichloracetic acid
Monochloroacetic acid
m-Nitroaniline hydrochloride
Diphenylamine hydrochloride
Diphenylamine trichloroacetic acid
Trichloroaniline hydrochloride
Diphenylamine hydrobromide
Iodeform
2:5 dichlorbenzene sulphonic acid
Benzene sulphonyl chloride
p-Toluene sulphonyl chloride
Ethylchlorsulphonate From the above list, it is clear many of the organic halogen compounds contain other substituents in addition to the halogen, such as hydroxy, amino, nitro, alkyl, aryl, and other groups. Therefore they may be also classified in other groupings of these modifying agents. Likewise, it is clear that the organic halogen compounds shown contain varying percentages of halogen; compounds containing 1 to 4 atoms of halogen in the molecule being set forth. Some of the halogen compounds are di- and triphenyl compounds, whereas others contain only a single benzene nucleus.

Another general class of modifying agents mentioned is that of the esters of inorganic acids, both aryl and alkyl esters being shown. Of that class the following compounds are illustrative:

Triphenyl phosphate
Tricresyl phosphate
Nitrocresyl carbonate
Ethyl chlorsulphonate
Dimethyl sulphate Still another general class is that of the inorganic salts of organic bases. Several illustrative examples of such compounds are mentioned, the following being typical:

m-Nitroaniline hydrochloride
Diphenylamine hydrochloride
Diphenylamine hydrobromide
Trichloroaniline hydrochloride
Diphenylamine sulphate
Diaminodiphenylamine sulphate
Aniline sulphate
Amino-azo-benzene sulphate As examples illustrative of organic salts of organic acids, there are mentioned diphenylamine trichloroacetate and methyl p-toluene sulphonate.

A further important general class is that of organic acids. A number of compounds has been given, both aromatic and aliphatic, to illustrate this class and the sub-classes thereof; the following being typical:

Monochloroacetic acid
Trichloroacetic acid
Formic acid
Oxalic acid
2:3 hydroxynaphthoic acid
Sulphosalicylic acid
Alpha-naphthyl sulphamic acid
Benzene sulphonic acid
p-Toluene sulphonic acid
2:5 dichlorobenzene sulphonic acid
m-Xylidine sulphonic acid
p-Toluidine m-sulphonic acid
Naphthalene 2:6 sulphonic acid
Beta-naphthol 1:5 sulphonic acid
Beta-naphthol 3:6:8 sulphonic acid
Beta-naphthylamine 3:6:8 trisulphonic acid
2:1 naphthylamine sulphonic acid
2:6 naphthylamine sulphonic acid
2-phenylamine-8-naphthol-6-sulphonic acid The above aromatic sulphonic acids, together with their esters and halides, form another sub-class which may be represented by the following formula $$R-SO_n-X$$

wherein R represents an aryl nucleus, X represents hydrogen, chlorine or an alkyl group and n is 2 or 3.

The methyl-p-toluene sulphonate and ethyl chlorsulphonate, mentioned ante, are illustrative of the esters. As illustrative of the halide compound, a number of compounds are given, the following being typical of the class of sulphonyl chlorides:

Benzene sulphonyl chloride
p-Toluene sulphonyl chloride
Naphthalene-1-sulphonyl chloride As in Ser. No. 446,170 various amines may be used as the modifying agent, as well as other organic bases, although they are mainly used in conjunction with another modifying agent in Ser. No. 359,425. Thus the following compounds are mentioned as as illustrative of the organic bases useful in the methods of the application:

Dinitroaniline
Diamino-diphenyl sulphide
Diamino-diphenyl sulphone
Benzidine
Alpha-naphthol
Phenol
Cresol
Pyrogallol
Glycerol
Quinoline Clearly a wide range of organic bases may be employed, according to the type of modified isocolloid product to be obtained from a given starting material. Also the use of arylhydroxy compounds, as the modifying agent, is further illustrated by the following compounds in addition to those given ante:

2:3-hydroxynaphthoic acid
And the other hydroxy naphthalenes
Compounds given ante
o-Nitrophenol
p-Nitrophenol The latter two compounds are nitro-aryl compounds and are also illustrative of that class of modifying agent, which is further illustrated by the following compounds:

p-Nitro acetanilide
Dinitroaniline
Nitrocresyl carbonate
m-Nitroaniline hydrochloride And in Ser. No. 446,174, I have further illustrated the use of nitro-aryl and hydroxy-aryl compounds, as the modifying agent in my processes; particularly aryl compounds containing both a nitro and a hydroxy group, such as the nitrophenols mentioned ante. And in that application, the nitrophenols or other organic polar compounds are used alone or in conjunction with metal salts or other modifying agents in making modified fatty oils, such as castor oil, linseed oil, etc. and other modified organic isocolloids. In fact, my Ser. No. 446,174 is a continuation in part of Ser. No. 359,425 and is directed to processes wherein the modifying agent or agents are so selected as to modify the solubility of the modified products in organic solvents, such as those used in lacquers, varnishes and like coating compositions. As there stated, modified products soluble in a given solvent can be obtained by employing as the modifying agent, a polar compound which is soluble in the solvent in question. That same principle may be applied in the present invention, as the modified products are here subsequently dispersed or dissolved in a larger quantity of isocolloid material; it being especially advantageous when the second isocolloid material is different from that employed in obtaining the initial modified isocolloid product. And for such purposes, the organic polar compounds shown in Ser. No. 359,425 as useful modifying agents are advantageous in the present processes.

And Ser. No. 359,425 being a generic application, I have, as pointed out ante, extensively illustrated the many classes and sub-classes of modifying agents that can be used in my processes for modifying isocolloid materials, either natural or artificial. Many of those modifying agents contain two or more groups, characteristic of the various classes set forth ante and which impart marked polarity thereto and to the isocolloid materials in which they are dissolved.

And as stated in my Ser. No. 359,425 and other prior applications, mixtures of modifying agents may be used. For instance, some of the organic modifying agents may be used in conjunction with the metal salts; the former assisting in dispersing the metal salt in the isocolloid material as illustrated therein. When organic compounds are used in conjunction with a modifying agent, I generally designate such compounds as "auxiliary agents" or "sensitizers." That is, as stated in Ser. No. 359,425, I have found that the dissolution of the "electrolytes" or other modifying agents in the starting-materials is very appreciably facilitated by the addition of certain "auxiliary agents" or "sensitizers." These fall into two groups, namely the purely inorganic compounds such as silica gel, fuller's earth, and the purely organic compounds such as, formaldehyde, phenol, thiocarbanilide, benzidine, hexamethylenetetramine, 2:3 hydroxynaphthoic acid, alpha-naphthol, quinoline, pyrogallol, benzene, glycerol and phthalimide. The specific examples of auxiliary agents here mentioned are to be taken as typical of the substances which have been successfully used for this purpose and not as comprising all the effective substances. It should be mentioned that some electrolytes, and quite a number of the polar compounds disclosed in the present application ante act as auxiliary agents (sensitisers) when used in conjunction with other modifying agents. For instance, the dissolution of 5% of sodium bisulphite in linseed oil is facilitated and the color of the product is made lighter by the addition of say 2% of such compounds as amino-azobenzene sulphate, aniline sulphate, nitrocresyl carbonate, dimethyl sulphate, trichloroacetic acid, benzenesulphonic acid, iodoform, naphthalene tetrachloride, pinene hydrochloride, m-xylidinesulphonic acid, beta-naphthylamine 6:8 disulphonic acid, beta naphthylamine 6-sulphonic acid, acetyl chloride, p-nitroacetanilide, chloral hydrate, triphenyl phosphate, naphthalene 1 sulphonylchloride, oxalic acid, diphenylamine hydrobromide, amino salicyclic acid, pale cresylic acid and o-dichlorobenzene.

The advantages of a rapid dissolution of the modifying agent are the greatest in those cases where a clear, pale or colorless modified product is desired, especially for the varnish industry. They are also important in the manufacture of oil products for the rubber industry, and are very manifest in the case of fatty oils to be treated with metal salts such as carbonates, sulphides, sulphites, hydrosulphites, thiosulphates, halides or acid salts such as alkali metal hydrogen sulphates or hydrogen phosphates, etc.; all of which salts are useful in the present processes as the modifying agent in the first step thereof.

And as stated in Ser. No. 359,425, I have found that those modifying agents are most effective which according to Frumkin's method (Z. physikalische Chemie, 1924, 109, 34–49) impart a negative surface charge to a liquid in which they are dispersed.

Further, the effectiveness of the modifying agent both the inorganic "electrolytes," such as metal salts, etc. or the organic polar compounds, disclosed ante, is appreciably greater when it is applied in the colloidal condition, for example, by dispersion in the starting material by means of some form of mill. And any suitable type of colloid mill may be used for this purpose. Other types of mixers may also be used for mixing the organic isocolloid and modifying agent. For instance, solid modifying agents may be ground in fatty oil and other liquid isocolloids in a paint mill or like grinders, before heating the mixture. Likewise, resins and powdered agents may be mixed by grinding, before heating. Again, in the case of rubber, the modifying agent may be milled into the rubber in a mixer without melting the rubber; the mixture being milled at about 80° C. and the modifying treatment carried out at between 100° and 180° C. The rubber readily absorbs the modifying agent without melting.

The modifying process may be accelerated, not only by radiations as mentioned in the prior specification, but also by making the mixture of starting-material and electrolyte part of an electric circuit.

By a suitable choice of modifying agents I obtain products which are suitable for manufacture of improved water-fast varnishes and lacquers. For this purpose I choose modifying agents which are substantially insoluble in water, such as tin carbonate, tin sulphite, tin sulphide, antimony sulphide, zinc sulphide, barium carbonate, calcium sulphite, strontium sulphite, magnesium sulphite, barium sulphite, lead sulphite, cadmium sulphite, cadmium sulphide, mercuric sulphate, and the like. Some of these are very difficultly soluble in the starting material, and in such cases it is advantageous to produce the modifying agent in situ. Thus barium sulphate is very insoluble in linseed oil, whilst magnesium sulphate and barium peroxide are easily soluble; I therefore dissolve these two substances in the linseed oil and produce within the oil the insoluble modifying agent, barium sulphate. By using zinc carbonate and barium peroxide in this way I produce in the oil barium carbonate and zinc oxide, both insoluble in water, and the product subsequently obtained gives an excellent, water-fast varnish.

I have found that the use of oxygen-generating substances, e. g. peroxides, and especially peroxides of metals giving water-insoluble compounds when combined with the anion of the modifying agent used, is particularly suitable for the production of varnish bases by my invention: the oxygen gas treatment which results from this procedure seems to have special value for this purpose. The following examples amongst others illustrate this feature. Zinc carbonate in conjunction with one of the following peroxides: bismuth peroxide, manganese peroxide, nickel peroxide, zinc peroxide, strontium peroxide, cerium peroxide; mercuric carbonate with barium peroxide or magnesium peroxide; lead carbonate with barium peroxide.

Obviously, the methods and modifying agents disclosed in my Ser. No. 359,425 are applicable not only to the production of solid varnish bases from liquid oils, but also to the conversion or partial conversion of solid or semi-solid resins into liquids for use in varnishes. And there, I refer to the products obtained by modifying oils as "oil products" and by modifying resins as "resin products." And as there stated, by vulcanization of oil products and of resin products, I obtain substances useful in making new types of lacquers and varnishes.

In the methods of Ser. No. 359,425, usually from 2 to 10 per cent of modifying agent (electrolyte or polar compound) is used, although in some cases as much as 30 per cent may be employed. The temperatures may range from 100° C. to 300° C., depending upon the materials used and the modification desired. And the treatment may be effected under reduced, atmospheric or increased pressure.

Ser. No. 359,425 is specifically directed to processes wherein a minor amount of a polar compound (2 to 10 per cent of a metal salt of an inorganic acid or an organic polar compound) is mixed with a fatty oil and the mixture heated to 200° C. or above until a modified, heat-bodied oil product is obtained and wherein the modified product is sometimes sulphurized.

The modified isocolloid products, either before or after being vulcanized, obtained by the methods of Serial No. 359,425, may be used in the present processes, as modifying agents to modify more of the same or a different isocolloid material, as stated ante.

When the methods and materials of Ser. No. 359,425 are used in conjunction with the present procedures, I can obtain a variety of new products, even from isocolloid materials initially containing but little dispersed phase.

The following examples further illustrate the present invention and show the manner in which the materials, procedures and products disclosed in my Ser. No. 143,786 and 359,425 and my other prior applications mentioned ante, may be used in the practice of my present methods; such examples being typical illustrations of this invention which is not limited to the details shown. And in these examples the parts are parts by weight unless otherwise specified.

Example 1

To 100 parts of linseed oil and 30 parts of sodium sulphide are heated to 250° C. and the mixture maintained between 250° and 300° C. until a greatly modified heat-bodied oil product is obtained which upon cooling to room temperature is a very hard beeswax-like material. The solidified oil product so obtained is useful as a modifying agent for modifying linseed oil and other fatty oils. It can be incorporated in such oils as shown in the following Example 2.

Example 2

To 400 parts of linseed oil are added 100 parts of the greatly modified heat-bodied linseed oil product obtained in Example 1; the ratio of the oil to the solidified oil product being 100:25. The mixture is heated to about 200° C. until the said modifying agent dissolves in the linseed oil and a molten, fused, homogeneous mass is obtained. Upon cooling a solid modified heat-bodied oil product is obtained which is useful as a varnish base or in other coating compositions.

In the above Example 2, in lieu of the linseed oil, I may use other drying oils such as tung oil, perilla oil, etc. to obtain other valuable varnish bases. Likewise, in the above example, other solidified oil products may be used as a modifying agent in lieu of the solidified linseed oil obtained with the aid of sodium sulphide.

And the solidified fatty oils obtained with the aid of organic polar compounds are advantageous in my present processes. This is evident from the examples given post.

Example 3

100 parts of linseed oil and 30 parts of benzidine are heated to 300° C. until a greatly modified oil product is obtained which upon cooling is a solid modified heat-bodied oil. About five hours is required to obtain such a product.

This solidified linseed oil product obtained with the aid of benzidine is useful as a modifying agent in the present invention as shown in Example 4.

Example 4

The solidified oil product obtained in Example 3 is added to 500 parts of linseed oil and the mixture heated to about 200° until said modifying agent is dissolved in the linseed oil and a heavily bodied linseed oil is obtained upon cooling. This bodied linseed oil has a relatively light color and is useful as a varnish base.

In the above example, the ratio of oil to modifying agent is 100:20. This ratio in the above example is merely illustrative and other valuable varnish bases may be obtained using benzidine as the initial modifying agent as shown in the following Examples 5 and 6.

Example 5

100 parts of linseed oil are heated under vacuum to 280-300° C. with 5 parts of benzidine for five hours. The modified oil product so obtained upon cooling forms a fairly hard solid. This solidified oil product is also useful in modifying fatty oils, as illustrated in the following example.

Example 6

100 parts of soya-bean oil are heated at about 200° C. with 2 parts of the solidified oil product obtained in Example 5 and the mixture maintained at that temperature for two and one-half hours. Upon cooling, a heavily bodied oil product is obtained. This bodied oil is useful as a varnish base. Varnish made from it, yields films having improved drying properties and increased water resistance.

Example 7

100 parts of linseed oil and 10 parts of lithium sulphite are heated to 300° C. under vacuum for five hours. Upon cooling to room temperature a solid oil product is obtained which is useful as a modifying agent for linseed and other fatty oils.

Example 8

100 parts of linseed oil and 5 parts of the solidified oil product obtained in Example 7 are heated until such modifying agent is completely dissolved and then the mixture is heated at 160° C. for two hours, advantageously under vacuum.

Upon cooling a thin gel-like oil is obtained. This modified oil product has good drying properties and may be used in making paints or varnishes. In making a varnish base, this oil product is usually cooked with suitable varnish resins.

By varying the ratio of the modifying agent in the above example, I can alter the consistency or viscosity of the oil product so obtained. By using more than 5 parts of the modifying agent, a stiffer gel is formed. On the other hand, using only one part of modifying agent, a viscous liquid oil product is obtained.

Further, the modified oil product so obtained may be vulcanized with sulphur to obtain vulcanized oil products. These vulcanized oil products are useful in rubber composition and may be added to rubber mixes which when subsequently vulcanized, yield cured rubber having a high tensile strength.

In the above example, during the modification of the linseed oil, an inert gas may be passed through the hot mixture with advantage. Also, instead of applying a vacuum, the oil may be blanketed with an inert gas.

Example 9

100 parts of linseed oil and 5 parts of 2:5-dichlorbenzene sulphonic acid are heated to 280–310° C. under vacuum and the heating continued for five hours. Upon cooling, a soft solid modified oil product is obtained. This solidified oil is useful as a modifying agent in modifying linseed and other fatty oils.

Example 10

To 100 parts of castor oil are added 4 parts of the solidified linseed oil product obtained in Example 9. The mixture is heated under vacuum to between 230° and 240° C. for about four hours. Upon cooling, a dark oil is obtained which is thicker than the original castor oil or a castor oil heated under the same condition but without addition of the solidified oil.

The modified oil product obtained in the above example is ash free and when used in protective coatings such as lacquers and varnishes it increases the alkali resistance of the films formed from such lacquers and varnishes.

Example 11

100 parts of perilla oil and 5 parts of p-nitro-acetanilide are heated under vacuum to 280–310° C. for five hours. Upon cooling, to room temperature, a soft solid oil product, moderately dark in color, is obtained. This solidified oil product is an advantageous modifying agent for modifying various fatty oils.

Example 12

To 100 parts of linseed oil are added 2 parts of the solidified perilla oil product obtained in Example 11. The mixture is heated to 250° C. and the heating continued for two and one-half hours. Then a further 2 parts of the said solidified oil are added and the mixture heated for a further one hour.

Upon cooling to room temperature a bodied oil is obtained which has improved drying qualities and yields films with improved water resistance.

In the Example 12, temperatures lower than 200° C. may be used in incorporating the modifying agent in the linseed oil, provided the time and temperature of heating is sufficient to dissolve the modifying agent in the oil and produce a homogeneous bodied oil.

Example 13

100 parts of rosin and 10 parts of benzidine are heated to 280° C. for five hours. Upon cooling a modified resin product having increased melting point is obtained.

This solidified resin is useful in modifying fatty oils and other resins.

Example 14

100 parts of heat-bodied linseed oil (stand oil), 50 parts of ester gum, together with 15 parts of the solidified resin product obtained in Example 13 are heated to 280–310° C. for three hours.

The varnish base so obtained is cooled and thinned with 165 parts of mineral spirits. To this solution so obtained is added the usual dryers. The resulting varnish has somewhat improved drying properties and yields films having greatly improved water resistance qualities as compared with a similar varnish, not containing the solidified modified resin addition.

Example 15

55 parts of Michler's ketone are melted together with 45 parts of the fatty acids of linseed oil until the melt on cooling gives a homogeneous mass. The product is then stirred into 700 parts of linseed oil at the lowest temperature at which the mass remains fluid, yielding a modified oil product suitable for use in the varnish and rubber industries.

Example 16

100 parts of the linseed oil fatty acids are fused together with 20 parts of p-phenylenediamine. The resultant product is then stirred into 700 parts of wood oil with gentle heating until complete incorporation is obtained.

Example 17

100 parts of the fatty acids obtained from China-wood oil are heated together with 48 parts of alpha-naphthylamine. The resulting product, stirred into 600 parts of linseed oil, gives an oil product having the consistency of a thickened oil.

From the above examples, it is evident that there are many commercial embodiments within the scope of the present invention. And in making commercial coating compositions by the present invention, my two step methods may be employed as continuous process or divided into two separate steps as indicated ante. Each procedure has its advantages.

When the same organic isocolloid is employed in both steps, it is sometimes advantageous to perform the two steps as a continuous operation. In such cases, the initial modifying agent (electrolyte or polar compound) is incorporated in a part of the starting material to obtain the greatly modified products (here used as a modifying agent), and then after such greatly modified product is obtained the remainder of the organic isocolloid to be modified is added without cooling the modifying agent to room temperature. Such addition of more of the starting material in the second step partially cools the mixture and the remainder of the modification may be accomplished at lower temperature desired. Also such continuous processes are advantageous when the isocolloids in the first and second steps are different but of the same general character. That is, for instance such continuous processes is sometimes advantageous when two different fatty oils are employed in each of the steps.

On the other hand, when a single modified product is to be used as the modifying agent for modifying various and different isocolloids in producing several different types of coating composition, it is advantageous to practice the first step of my first processes as a separate and distinct operation to obtain such modifying agent as a stock material which may be stored for subsequent use.

The following examples further illustrate the preparation of modified products which are useful in the present invention, as modifying agent for organic isocolloids.

*Example 18*

300 parts of resin are heated with 20–30 parts by weight of zinc carbonate and 5 parts by weight of formic acid under a vacuum of 25–30 inches of mercury for 10–12 hours at 270–280° C.

The product is a very viscous oil. This modified product is useful as a modifying agent in the present processes and may be used to modify artificial resin and synthetic resin, particularly ester gum.

*Example 19*

300 parts of linseed oil are heated in vacuum with 15 parts of triphenyl phosphate exactly as described in Example No. 3 of my Ser. No. 359,425.

The product is a moderately dark viscous oil. This modified oil product is also useful as a modifying agent for resins and oils.

*Example 20*

300 parts of linseed oil are heated under vacuum to 270–300° C. for 5 hours with a mixture of 7½ parts of zinc carbonate and 7½ parts of barium peroxide. The product on cooling is a moderately soft solid. This modified oil product is another advantageous modifying agent in my present invention.

By substituting rosin for the linseed oil in Examples 19 and 20 other valuable modifying agents can be obtained.

*Example 21*

150 parts of linseed oil are heated under vacuum to 290–310° C. for 5 hours with a mixture of 7½ parts of sodium bisulphite and 3 parts of fuller's earth. The resulting product is a moderately soft solid. This solidified oil is a good modifying agent in the present invention.

In the above example, the fuller's earth may be replaced with dimethyl aniline, glycerol or the other auxiliary agents mentioned ante, as being useful in conjunction with metal salts.

*Example 22*

100 parts of linseed oil is heated together with 5 parts of lead carbonate and 2 parts of glycerine, to 290° C.–310° C. for five hours.

The modified oil product so obtained is an advantageous modifying agent for modifying fatty oils or natural resins such as rosin. And other valuable modifying agents can be obtained by substituting other fatty oils and other metal salts in this example. For instance, tung oil may be used in lieu of the linseed oil or lead sulphide in place of the lead carbonate or both substitutions may be made. Also a larger amount of glycerine may be used, say 3 or more parts thereof.

The modified linseed oil products and the modified tung oil products, obtained according to Example 22 may be advantageously used to modify rosin or ester gum. For instance, 30 parts of such modified oil products may be added to 100 parts of rosin or ester gum and the mixture heated to about 200° C. until a fused, homogeneous mass is obtained. Such modified products are useful in making coating compositions such as varnishes and the like.

*Example 23*

100 parts of Chinawood oil, 5 parts of zinc carbonate and 5 parts of barium peroxide are heated at 290° to 300° C., for 5 hours, to form a greatly modified oil product.

This solidified oil product is useful as a modifying agent in the present invention. It is advantageous for modifying fatty oils or resins or mixtures of fatty oils and resins; particularly ester gum and stand oil, such as heat bodied linseed oil, or mixtures of stand oil and ester gum. The following example illustrates its use in modifying a varnish mixture containing stand oil and a resin, such as a synthetic resin, namely ester gum.

*Example 24*

To 100 parts of linseed stand oil (heat bodied linseed oil), having a viscosity of Q (Gardner-Holdt scale) and 50 parts of ester gum (glycerine ester of rosin), there are added 100 parts of the modified tung oil product obtained in Example 23. The mixture is heated at 270° C. to 280° C. until a varnish base of the desired body is obtained upon cooling to room temperature.

The varnish base (mixed modified oil and resin) so obtained may be thinned with suitable varnish solvents to obtain varnishes, having the desired solid content and viscosity. Mineral spirits may be used to obtain a useful varnish. However to obtain varnishes, having a high solid content with a relatively low viscosity, aromatic solvents may be used, such as coal tar hydrocarbons and hydrogenated naphthas. Such aromatic hydrocarbons have high solvent power for my modified varnish bases. Likewise mixed solvents may be used. Small amounts of alcohols, such as ethyl alcohol or butyl alcohol, may be added to reduce the viscosity of my varnishes. The resulting varnishes, after metallic driers are added to them, are very fast drying.

Further in Example 24, I may reduce the amount of stand oil or increase the amount of ester gum to obtain other valuable varnish bases. The amounts of oil used may be reduced also and the proportion of the ester gum increased. The products containing higher amounts of ester gum yield harder films or coatings, but the products with higher oil content yield more flexible coatings.

This Example 24, illustrates my methods of modifying a mixture of two different organic isocolloids with my new type of modifying agents, namely greatly modified isocolloids containing a polar compound.

*Example 25*

100 parts of rosin and 10 parts of benzidine base are heated at 270° to 280° C., for 5 hours, to form a greatly modified rosin product.

This hardened rosin product is a good modifying agent for other resins and for fatty oils, including stand oils.

*Example 26*

To 200 parts of stand oil (heat bodied linseed oil), having a viscosity of Q in the Gardner-Holdt scale, are added 100 parts of the modified resin product obtained in Example 25. This mixture is heated at 270°–300° C., until a blended mixture of modified oil and modified resin, having the desired body, is obtained.

The varnish bases so obtained, may be thinned with suitable solvents to obtain desired varnishes. The solvent may be petroleum thinner or coal tar thinner or hydrogenated naphtha thinner. Here, as in Example 24, mixed solvents may also be used.

The varnishes so obtained are good drying, and yield coatings, which resist to water and weather.

In Examples 24 and 26 any varnish oil or resin may be used as addition to the greatly modified isocolloids and the examples are illustrative and do not limit the scope of the invention.

*Example 27*

As a greatly modified isocolloid a concentrated dispersion of sulfuric acid in castor oil is prepared, by mixing together 10 parts by weight of sulfuric acid, concentrated, and 90 parts by weight of castor oil. This mix is stored cold (at room temperature) a few hours, e. g. overnight. It may be stored also for a longer time, before used, without changing the results to be obtained to any great extent.

*Example 28*

1000 parts by weight of castor oil and 20 parts by weight of the greatly modified castor oil product, containing 10% concentrated sulfuric acid, prepared according to Example 27, is mixed together and the mix is heated to 270° C. under vacuo and held there for 1 hour. Then the temperature is reduced to 250° C. and the mixture is maintained at this temperature for two hours. During the entire reaction $CO_2$ gas is bubbled through the mixture in such a manner as to maintain a vacuum of about 50 mm. Hg in the autoclave. 10 parts by weight of glycerine is added at this stage and the heating is continued at 200° C., for another two hours. Also during this last part of the reaction $CO_2$ is bubbled through, but vacuum may be replaced by atmospheric pressure during the last stage of the process. The resulting oil shows low acid number and good drying properties, yielding very good water and weather resistant films, when used in protective coatings.

In addition to the specific embodiments of this invention given in the examples ante for purposes of illustration, obviously there are, as has been indicated in this specification, many other embodiments thereof, which may be practiced within the broad scope of the present invention. And it is believed that all such embodiments will be clear to skilled persons in view of the full description of this invention set forth in this application.

And as to the present invention, in its broad scope, it should be mentioned that especially good results and products are obtained when thickened fatty oils, such as stand oils, blown oils, etc., are used as the organic isocolloid in my present methods. Such thickened fatty oils are generally obtained by blowing air or another gas, such as carbon dioxide, nitrogen, hydrogen, hydrogen sulphide, sulphur dioxide, etc., through the oil to be thickened at room temperatures or at elevated temperatures; sulphur dioxide being particularly effective and advantageous for this purpose. And the thickened oils so obtained can be used in either step of my present two step methods. This is as set forth in my Ser. No. 446,172. And as also stated in that application, gases such as sulphur dioxide, hydrogen sulphide, carbon dioxide, hydrogen, nitrogen and other inert gases may be advantageously passed through the organic isocolloid mixtures in either or both steps of my present processes during the heating to facilitate the modification of such organic isocolloids. This gas treatment being generally advantageous as stated in my Serial No. 446,172 and other applications.

In the present processes, the above mentioned thickened fatty oils, such as stand oil, etc., may be used with advantage as the organic isocolloid in the second step thereof. By using such thickened oils, modified, heavily bodied products are readily obtained.

Also such thickened fatty oils may be used in the first step of my present methods, as the organic isocolloid and modified with a polar compound to obtain greatly modified products which are useful as a modifying agent in the second step of the present processes. As to so modifying such thickened fatty oils with polar compounds, various methods are disclosed in my Ser. No. 466,587 filed July 8, 1930, and Ser. No. 188,014 filed Jan. 13, 1938. As there shown greatly modified products can be readily obtained from such thickened fatty oils or stand oils. And such greatly modified products are here used as modifying agents to modify more of the same or another organic isocolloid.

Further in the present invention, the organic isocolloids may be vulcanized to further modify them. For instance, in the first step of the present processes (in the preparation of the modified isocolloid products subsequently used as a modifying agent) part of the modification may be obtained by vulcanizing or sulphurizing the oil, resin, etc. To effect this sulphurization, sulphur may be added as such or in the form of a sulphur compound which, under the conditions of the process, decomposes with liberation of nascent sulphur. This may be done by adding sulphur to the initial substance in addition to the polar compounds mentioned ante. Again, the sulphur or sulphur compound (vulcanizing agent) may be added to the material after the main reaction of the process has been completed; that is, after the organic isocolloid has been modified with the polar compounds, the sulphurization or vulcanization being carried out as a subsequent step. In either of these ways, there are obtained sulphurized modified products which are useful as modifying agents in the present processes.

Likewise, the final products obtained by the present two step methods may be advantageously vulcanized as a subsequent step to the main process. These vulcanized products are valuable components in various coating compositions as shown post.

In vulcanizing the modified organic isocolloids, in either of the steps of the present method, I may use vulcanization accelerators to facilitate the vulcanization. For instance, the following accelerators may be used with advantage:

Triphenylguanidine
Mercaptobenzthiazole
Tetraethylthiuram disulphide

And sulphurization at temperatures below 100° C. may be obtained by using super-accelerators such as, piperidine pentamethylene dithiocarbamate and diethylammonium diethyldithiocarbamate. Also, activators, such as zinc oxide, etc. may be used in conjunction with such accelerators, to further facilitate vulcanization. And when the vulcanized products are to be used in plastic compositions such as rubber compositions and the like, I may also add antioxidants, such as p-aminophenol, hydroquinone, compounds obtained by condensing alpha and beta naphthylamines or mixtures of these bodies with aldehydes. (See U. S. Patent No. 1,777,352.) Such additions are included in my prior applications as "purely organic bodies."

By the vulcanization of oil-products and of resin products, I obtained products which are useful in making new types of lacquers and varnishes. Various combinations of vulcanized and unvulcanized oil products or resin products may be used in making various coating compositions. For instance, a resin product may be vulcanized and used with an unvulcanized oil product. Again, a vulcanized oil product may be used with an unvulcanized resin product. Further, a mixture of oil product and a resin product may be vulcanized together.

And the various vulcanized, modified products obtained by the present invention are generally useful and valuable in making varnishes and lacquers. They give films which are very elastic, fast to weathering, and suitable for stoving. After stoving they exhibit a high degree of resilience and hardness. The character of the varnishes and lacquers may be varied by varying the temperature of vulcanization, the proportion of sulphur, the nature and quantity of accelerator and activator, and further by the addition of fillers; e. g. when gas black is applied as a filler the ageing properties of the varnish films are improved accordingly.

Further, the modified organic isocolloid materials obtained by my two-step processes can be emulsified in water and other aqueous liquids, according to the processes set forth in my prior application Ser. No. 359,424. Such emulsions may be further processed as described in that application. The aqueous emulsions so obtained are useful coating compositions. Upon evaporation of water, they yield good coatings. For example, they may be used for impregnating textiles. Also, they can be mixed with natural rubber latex or artificially prepared emulsions of rubber. That is, as stated in my prior application Ser. No. 446,172, the present methods can be used to prepare a wide variety of plastic and liquid coating compositions.

What I claim is:

1. In the preparation of varnish bases, a multi-step process comprising first heating a batch of an organic isocolloid varnish base material selected from the class consisting of fatty oils and resins to a temperature above 100° C., but not above 350° C. or the boiling or decomposition point, with from 2% to 30% of a polar compound, to modify the properties of said batch of varnish base material extensively, including raising the solidification point and viscosity thereof, and thereafter blending said extensively modified varnish base material with a second batch comprising an additional constituent of the varnish base being prepared which additional constituent is selected from the class consisting of fatty oils and resins, and heating the blend to a temperature above 100° C., but not above 350° C. or the boiling or decomposition point thereof; the modification in the material of said first batch being of greater extent than could be effected therein by the same treatment applied to the total varnish base being prepared; whereby a modified varnish base is secured having improved characteristics, such as color and drying properties, as compared with a similar modified varnish base secured by conjoint treatment of the several constituents thereof.

2. A process in accordance with claim 1 in which the varnish base material of said first batch is a fatty oil.

3. A process in accordance with claim 1 in which the varnish base material of said first batch is a fatty oil, and in which the varnish base material of said second batch is also a fatty oil.

4. A process in accordance with claim 1 in which the varnish base material of said second batch is a varnish resin.

5. A process in accordance with claim 1 in which the varnish base material of said first batch is a fatty oil, and in which the varnish base material of said second batch is a varnish resin.

6. A process in accordance with claim 1 in which the varnish base material of said first batch is a linseed oil.

7. A process in accordance with claim 1 in which the varnish base material of said first batch is a soya bean oil.

8. A process in accordance with claim 1 in which the varnish base material of said first batch is a castor oil.

9. A process in accordance with claim 1 in which the varnish base material of said second batch is rosin.

10. A process in accordance with claim 1 in which the varnish base material of said second batch is a synthetic varnish resin containing rosin.

11. A coating composition containing a varnish base prepared in accordance with the method of claim 1.

12. A coating composition containing a varnish base prepared in accordance with the method of claim 1, and in which the varnish base material of said first batch is a fatty oil, and the varnish base material of said second batch is a varnish resin.

13. A coating composition containing a varnish base prepared in accordance with claim 1, and in which the varnish base material of said first batch is a linseed oil.

14. A coating composition containing a varnish base prepared in accordance with claim 1, and in which the varnish base material of said first batch is a soya bean oil.

15. A coating composition containing a varnish base prepared in accordance with claim 1, and in which the varnish base material of said first batch is a castor oil.

LÁSZLÓ AUER.